United States Patent
Sakai

(10) Patent No.: US 8,229,315 B2
(45) Date of Patent: Jul. 24, 2012

(54) IMAGE FORMING APPARATUS AND CONTROL METHOD THEREFOR

(75) Inventor: Akihiko Sakai, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 12/781,288

(22) Filed: May 17, 2010

(65) Prior Publication Data

US 2010/0296831 A1     Nov. 25, 2010

(30) Foreign Application Priority Data

May 20, 2009    (JP) .................................. 2009-122095

(51) Int. Cl.
     *G03G 15/00*        (2006.01)
(52) U.S. Cl. ......................................................... 399/85
(58) Field of Classification Search .................... 399/42, 399/75, 81, 82, 85–87, 401
See application file for complete search history.

(56) References Cited

U.S. PATENT DOCUMENTS

| | | | | |
|---|---|---|---|---|
| 4,812,877 A | * | 3/1989 | Nishimori et al. | 399/82 |
| 4,935,786 A | | 6/1990 | Veeder | |
| 6,029,041 A | * | 2/2000 | Takano et al. | 399/388 |
| 6,935,239 B2 | * | 8/2005 | Mizuno et al. | 101/483 |

FOREIGN PATENT DOCUMENTS

| | | |
|---|---|---|
| JP | 09-190021 | 7/1997 |
| JP | 10-268587 | 10/1998 |
| JP | 2004-343409 | 12/2004 |

* cited by examiner

*Primary Examiner* — Hoan Tran
(74) *Attorney, Agent, or Firm* — Fitzpatrick, Cella, Harper & Scinto

(57) ABSTRACT

An image forming apparatus which is capable of avoiding unnecessary switching operation to switch between a one-sided printing and a two-sided printing to improve print productivity. A printing mode is switched between a two-sided printing mode to continuously form images on first sides of a predetermined number of sheets and to alternately form images on second sides of sheets conveyed along a sheet re-feeding conveyance path and on the first sides of sheets fed from a sheet feeding unit, and a one-sided printing mode without using the sheet re-feeding conveyance path. It is determined that, when a one-sided print job is performed between a two-sided print jobs, whether the one-sided print job is performed in the two-sided printing mode as-is or in the one-sided printing mode, depending on whether the number of sheets continuously printed by the one-sided print job is more than a predetermined number.

9 Claims, 16 Drawing Sheets

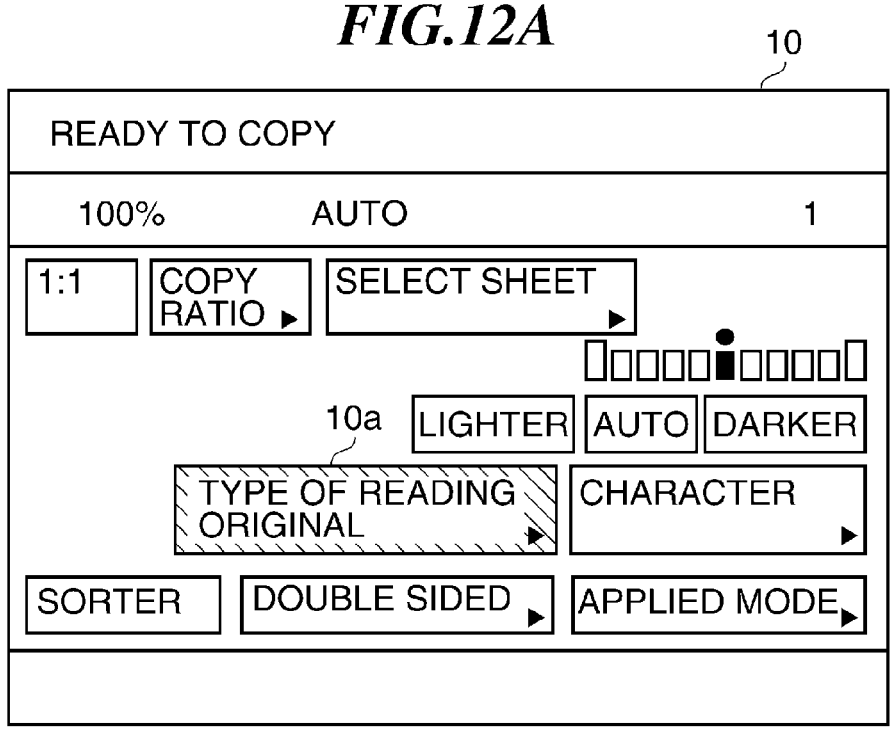
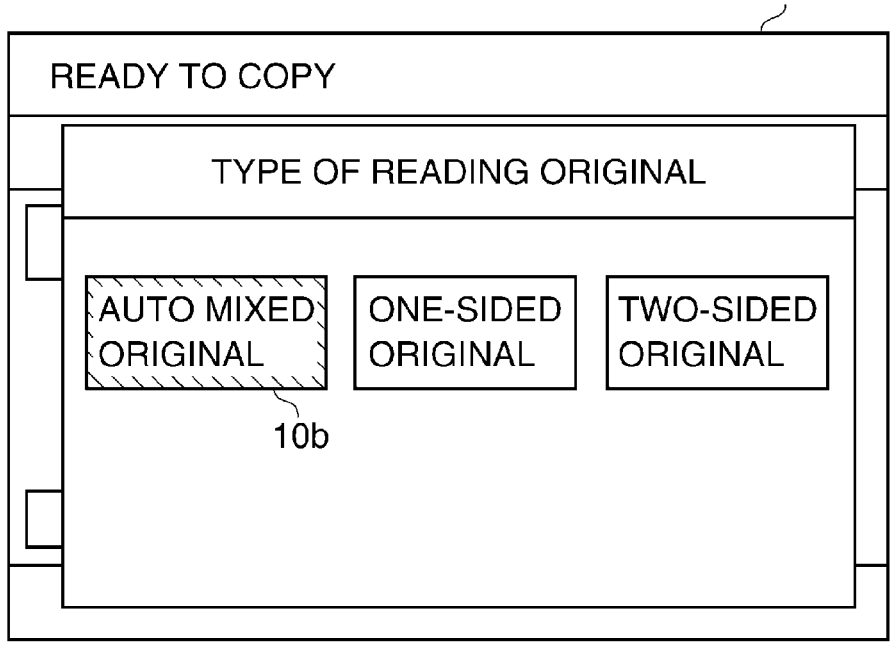

FIG.14

| SIZE | IMAGE FORMING TIME |
|---|---|
| B5 | TL1 |
| A4/LTR | TL2 |
| B5R | TL3 |
| A4R/LTRR | TL4 |
| B4 | TL5 |
| A3/LDR | TL6 |

IMAGE FORMING APPARATUS AND CONTROL METHOD THEREFOR

BACKGROUND OF THE INVENTION

1. Field of the Invention

The present invention relates to an image forming apparatus such as a copier and a control method therefor.

2. Description of the Related Art

In recent years an original image reading device that automatically feeds an original stacked on a document feeding device and reads images on front and back sides of the original concurrently in one pass through a conveyance path without turning the original upside down (e.g., see Japanese Laid-Open Patent Publication (Kokai) No. 2004-343409 (JP2004-343409A)) has been suggested. In such an original image reading device, a reading speed for a one-sided original on which an original image is formed on only one side is almost equal to that for a two-sided original on which original images are formed on both sides. Therefore, even if one-sided originals and two-sided originals are mixed in originals to be read, it is possible to read images at high speed without considering a difference between reading speeds of a one-sided original and a two-sided original.

On the other hand, in an image forming apparatus that prints a read image, it is necessary to have a pair of printing mechanisms for front and back sides independently in order to print images on both of front and back sides in one pass through a conveyance path. However, since the printing mechanism is complicated and expensive in an image forming apparatus by electrophotography printing, a plurality of printing mechanisms will enlarge the apparatus and increase a cost. Therefore, two-sided printing is performed by a single printing mechanism by printing a front side and a back side alternately.

Since in the image forming apparatus of such a configuration it is necessary to convey a recording sheet medium to an image forming unit again after performing processes such as printing on a front side of the recording sheet medium and a turnover of printed sides, a conveyance path for the recording sheet medium necessarily becomes longer. Therefore, when images are printed on the front and back sides of the recording sheet medium alternately, a waiting time from completion of printing on the front side to a start of printing on the back side becomes extremely long, which remarkably reduces productivity when a plurality of sheets are printed.

Then, a through pass two-sided method that minimizes a reduction of the productivity when performing a large amount of two-sided prints has been suggested. In this method, front sides of two or three recording sheet mediums are printed first, and then, the recording sheet mediums that are turned over to be printed on their back sides and new recording sheet mediums to be printed on their front sides are alternately printed. This technique is disclosed in U.S. Pat. No. 4,935,786.

Conventionally, an image forming apparatus, which has an original image reading device that automatically reads a two-sided original, which determines whether an original is a one-sided original or a two-sided original, and which switches between a one-sided printing and a two-sided printing automatically according to the determination result, has been suggested. This technique is disclosed in, for example, Japanese Laid-Open Patent Publication (Kokai) No. H09-190021 (JP H09-190021A), Japanese Laid-Open Patent Publication (Kokai) No. H10-268587 (JP H10-268587A), etc.

However, the above-mentioned conventional techniques have the following problems.

First, in the image forming apparatus performing a two-sided printing by the through pass two-sided method disclosed in the U.S. Pat. No. 4,935,786 etc., there is the following problem.

When copying a batch of originals in which one-sided originals and two-sided originals are mixed, an operator is necessary to set the one-sided printing or the two-sided printing to be performed beforehand according to the originals, which is complicated for the operator.

Furthermore, although the image forming apparatus in which it is possible to switch between the one-sided printing and the two-sided printing automatically as disclosed in Japanese Laid-Open Patent Publication (Kokai) No. H09-190021 (JP H09-190021A) and Japanese Laid-Open Patent Publication (Kokai) No. H10-268587 (JP H10-268587A) does not need the setting operation for the one-sided printing or the two-sided printing, there is the following problem.

When the two-sided printing is switched to the one-sided printing, the one-sided printing must be re-started after outputting all the recording sheet mediums in the apparatus in order to stack the printed sheet mediums onto a sheet eject tray in a correct page order. That's because it is necessary to eject the sheet mediums staying in the conveyance path along which the sheet medium is re-conveyed to the image forming unit after completing processes such as the printing process for the front side of the recording sheet medium and the turning over, during the two-sided printing. Therefore, a time lag occurs after finishing the two-sided printing once until when the one-sided printing becomes possible to start. Accordingly, when copying a batch of originals in which one-sided originals and two-sided originals are mixed, the one-sided printing and the two-sided printing are frequently switched at a small number of sheets, which causes a problem of reducing print productivity.

SUMMARY OF THE INVENTION

The present invention provides an image forming apparatus and a control method therefor, which are capable of avoiding unnecessary switching operations to switch between a one-sided printing and a two-sided printing to improve print productivity.

Accordingly, a first aspect of the present invention provides an image forming apparatus comprising an input unit adapted to input a one-sided print job to form an image on one side of a sheet or a two-sided print job to form images to both sides of a sheet, a sheet feeding unit adapted to feed a sheet, an image forming unit adapted to form an image to a sheet based on a print job input by the input unit, a sheet re-feeding conveyance path adapted to re-feed a sheet, on which an image is formed on a first side, to the image forming unit in order to form an image on a second side thereof, and a printing mode switching unit adapted to selectively switch a printing mode between a two-sided printing mode to form images on both sides of sheets by continuously forming images on the first sides of a predetermined number of sheets and by alternately forming images on the second sides of sheets conveyed from the sheet re-feeding conveyance path and on the first sides of sheets fed from the sheet feeding unit, and a one-sided printing mode to form images on one sides of sheets without using the sheet re-feeding conveyance path, wherein the printing mode switching unit determines, when the one-sided print job is performed between the two-sided print jobs, whether the one-sided print job is performed in the two-sided printing mode or in the one-sided printing mode, depending on whether the number of sheets continuously printed by the one-sided print job is more than a predetermined number.

Accordingly, a second aspect of the present invention provides an image forming apparatus comprising an image forming unit adapted to perform two-sided printing to form images on both sides of a sheet or one-sided printing to form an image on one side of a sheet, an input unit adapted to input images that should be formed on a first side and a second side of a sheet, a first determination unit adapted to determine whether the images input by the input unit are two-sided original images that are formed on both sides of a sheet or the image input by the input unit is a one-sided original image that is formed on only one side of a sheet, a second determination unit adapted to determine whether printing in operation is the two-sided printing or the one-sided printing when the first determination unit determines that the input image is the one-sided original image, and a control unit adapted to perform an alternate sheet feeding printing, in which images are formed in advance to first sides of sheets that can be conveyed within time period required to convey a sheet, on which an image is formed on a first side, to the image forming unit again when the two-sided printing is performed, and to control whether the two-sided printing is switched to the one-sided printing based on a continuous number of the one-sided original images continued following the two-sided original images when the second determination unit determines that the two-sided printing is performing.

Accordingly, a third aspect of the present invention provides a control method for an image forming apparatus that comprises an input unit to input a one-sided print job to form an image on one side of a sheet or a two-sided print job to form images on both sides of a sheet, a sheet feeding unit to feed a seat, an image forming unit to form an image to a sheet based on a print job input by the input unit, and a sheet re-feeding conveyance path to re-feed a sheet, on which an image is formed on a first side to the image forming unit in order to form an image on a second side thereof, and selectively switches a printing mode between a two-sided printing mode to form images on both sides of sheets by continuously forming images on the first sides of a predetermined number of sheets and by alternately forming images on the second sides of sheets conveyed from the sheet re-feeding conveyance path and on the first sides of sheets fed from the sheet feeding unit, and a one-sided printing mode to form images on one sides of sheets without using the sheet re-feeding conveyance path, the control method comprising determining whether the one-sided print job is performed between the two-sided print jobs, determining the number of sheets to which images are continuously formed by the one-sided print job when the one-sided print job is performed between the two-sided print jobs, and determining whether the one-sided print job is performed in the two-sided printing mode or in the one-sided printing mode depending on whether the number of sheets continuously printed by the one-sided print job is more than a predetermined number.

Accordingly, a fourth aspect of the present invention provides a control method for an image forming apparatus that comprises an image forming unit to perform two-sided printing to form images on both sides of a sheet or one-sided printing to form an image on one side of a sheet, an input unit to input images that should be formed on a first side and a second side of a sheet, and allows an alternate sheet feeding printing, in which images are formed in advance to first sides of sheets that can be conveyed within time period required to convey a sheet, on which an image is formed on a first side, to the image forming unit again when the two-sided printing is performed, the control method comprising a first determination step of determining whether the images input by the input unit are two-sided original images that are formed on both sides of a sheet or the image input by the input unit is a one-sided original image that is formed on only one side of a sheet, a second determination step of determining whether printing in operation is the two-sided printing or the one-sided printing when it is determined that the image inputted is the one-sided original image in the first determination step, and a control step of controlling whether the two-sided printing is switched to the one-sided printing based on a continuous number of the one-sided original images continued following the two-sided original images when it is determined that the two-sided printing is performing in the second determination step.

According to the present invention, unnecessary switching operation to switch between the one-sided printing and the two-sided printing can be avoided, which improves the print productivity.

Further features of the present invention will become apparent from the following description of exemplary embodiments with reference to the attached drawings.

BRIEF DESCRIPTION OF THE DRAWINGS

FIGS. 12A and 12B are views showing selection screens of a printing mode according to the embodiment.

FIG. 14 is a view showing table data holding image forming time depending on a size of a sheet medium according to the embodiment.

DESCRIPTION OF THE EMBODIMENTS

Hereafter, embodiments according to the present invention will be described in detail with reference to the drawings.

Figure 1:
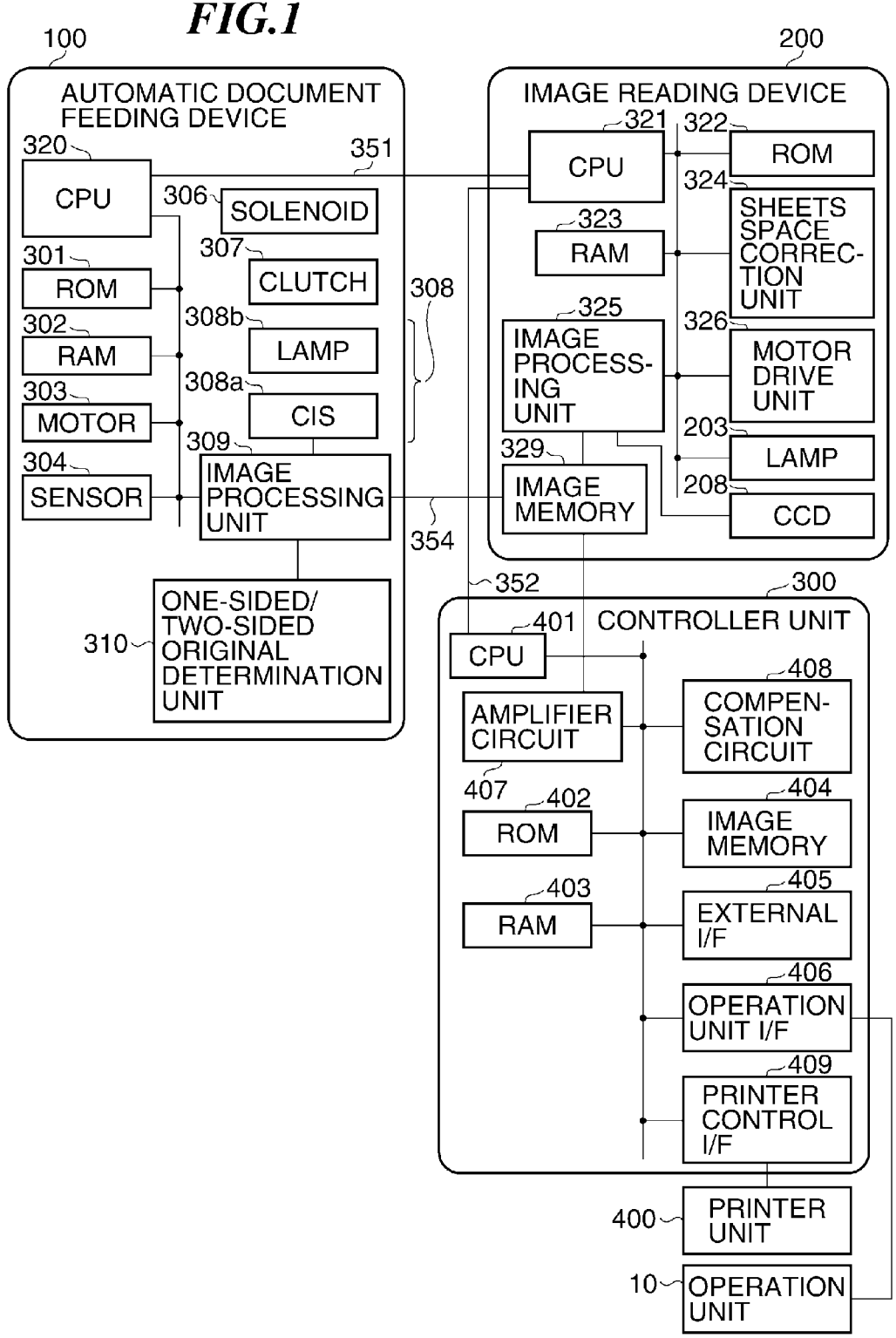
FIG. 1 is a block diagram schematically showing a configuration of a control system of an image forming apparatus according to an embodiment of the present invention.

FIG. 1 is a block diagram schematically showing a configuration of a control system of an image forming apparatus according to an embodiment of the present invention.

This image forming apparatus is comprised of an operation unit 10, an automatic document feeding device 100, an image reading device 200, a controller unit 300, and a printer unit 400. The operation unit 10 controls a user interface such as reception of a key input and display of information. The automatic document feeding device 100 and the image reading device 200 can read images on both front and back sides of an original in parallel. The printer unit 400 has a function of printing a read original image. The controller unit 300 controls operations of the whole of the image forming apparatus.

A control system of the automatic document feeding device 100 is provided with a central processing unit (CPU) 320, a read-only memory (ROM) 301, a random-access memory (RAM) 302, an output port and an input port. The ROM 301 stores a control program, and the RAM 302 stores inputted data and working data. In addition, the output port is connected to a motor 303 that drives rollers of various types of conveyance, to a solenoid 306, and to a clutch 307. The input port is connected to various types of sensors 304.

The CPU 320 controls conveyance of an original according to the control program stored in the ROM 301. The CPU 320 performs a serial communication with the CPU 321 of the image reading device 200 through a line 351 in order to transmit/receive control data to/from the image reading device 200. An image front signal as a reference of a front edge of an original image data is delivered to the image reading device 200 through a communication line 354.

A back-side-image-reading unit 308, which is provided with a light receiving sensor (CIS) 308a and a lamp 308b to read a back image of an original, is connected to an image processing unit 309. The back image read is transmitted to the image processing unit 309. The image processing unit 309 has a blank sheet detection function of determining whether an original does not have an image on a back side thereof (a blank sheet) other than an image processing function that is necessary for reading an image. When quantity of back image data at a time of reading is less than a reference value, the blank sheet detection function determines that the back side is blank.

Furthermore, a one-sided/two-sided original determination unit 310 is connected to the image processing unit 309. When a back side of an original is detected as a blank sheet, the one-sided/two-sided original determination unit 310 determines that the original during reading is a one-sided original. On the other hand, when a back side of an original is not detected as a blank sheet, it is determined that the original is a two-sided original.

The image reading device 200 has a front-side-image-reading unit, which is provided with a lamp 203 and a CCD 208 to read a front image of an original, a sheets space correction unit 324, a motor drive unit 326, an image processing unit 325, and an image memory 329 other than a CPU 321, a ROM 322, and a RAM 323.

The CPU 321 controls an operation of the image reading device 200 according to a program stored in the ROM 322, and the RAM 323 functions on this occasion as a work area. The motor drive unit 326 is a driver circuit to drive a drive motor of an optical system. The sheets space correction unit 324 corrects a space between sheets. An image signal of an image formed on the CCD 208 is converted into digital image data, and various image processes are applied by the image processing unit 325, and it is written in the image memory 329.

In addition, an image processed by the image processing unit 309 in the automatic document feeding device 100 is also stored in the image memory 329 through an image communication line 354. The data written in the image memory 329 is transmitted to the controller unit 300. It should be noted that when a back side image read by the image processing unit 309 is blank, such information is also transmitted to the controller unit 300. Furthermore, an image front signal as a reference of a front edge of original image data is delivered to the controller unit 300 in timing provided by the CPU 321.

The controller unit 300 includes an amplifier circuit 407, a compensation circuit 408, an image memory 404, an external I/F 405, an operation unit I/F 406 and a printer control I/F 409. Furthermore, a CPU 401 controlling those circuits is provided, and the CPU 401 executes a program stored in a ROM 402, and a RAM 403 functions on this occasion as a work area.

The CCD 208 and the CIS 308a output analog image signals every one line of reading in a process of scanning an image of an original, and the analog image signals are transmitted to the controller unit 300 via the image processing units 325 and 309, respectively. Those signals are amplified by the amplifier circuit 407 and then, transmitted to the compensation circuit 408. The compensation circuit 408 applies a compensation process to the image signal, and stores it in the image memory 404. The above-mentioned process is performed for the entire image area of an original, and a reading image of the original is formed. The read image of the original is printed on a sheet medium by the printer unit 400 connected to the printer control I/F 409.

In addition, the operation unit 10 connected through the operation unit I/F 405 is comprised of a liquid crystal display unit with a touch panel and the like that allows to input a process execution content by an operator and to notify the operator of information, warning, etc. about a process.

FIGS. 2A and 2B, FIGS. 3A and 3B, FIGS. 4A and 4B, and FIG. 5 are sectional views schematically showing actions of the automatic document feeding device and the image reading device when the image reading device 200 reads an original.

Figure 2A:
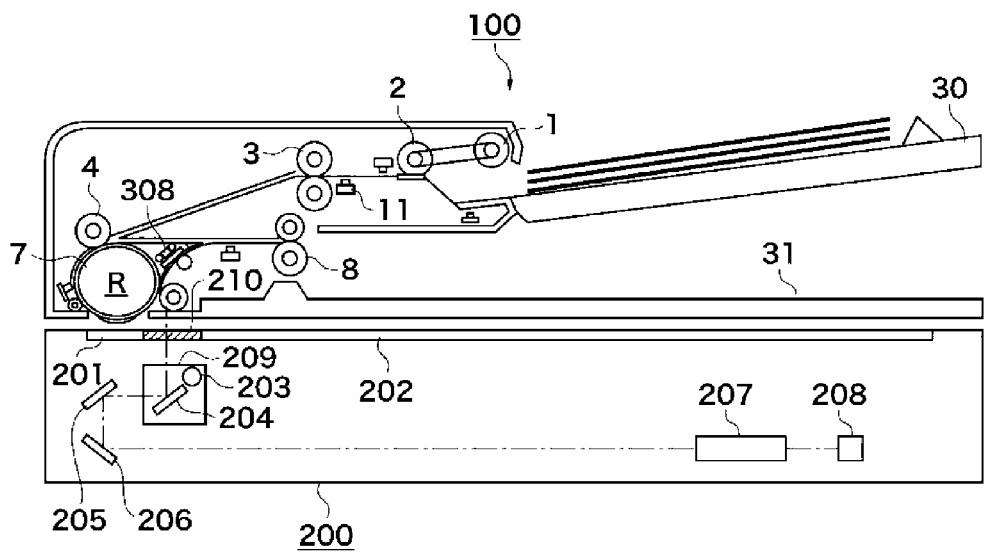
FIGS. 2A and 2B are sectional views schematically showing actions of an automatic document feeding device and an image reading device according to the embodiment.
Figure 2B:
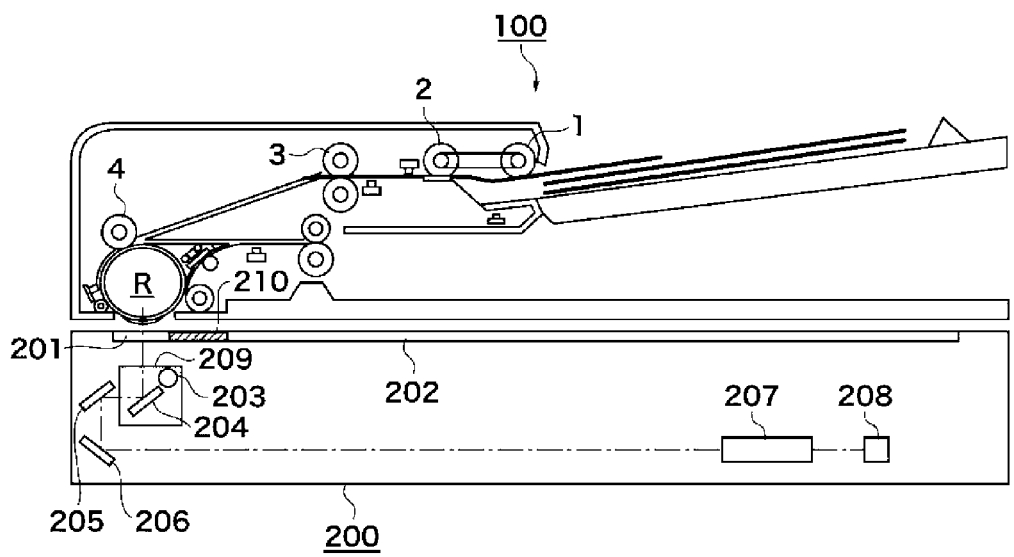

First, schematic configurations of the automatic document feeding device and the image reading device will be described using FIG. 2A before describing actions of reading an original.

The automatic document feeding device 100 has an original tray 30 on which an original batch comprised of one or more sheets is stacked, a sheet feeding roller 1 to feed the top original in the original batch, and a separation roller 2 to separate one sheet from the original fed by the sheet feeding roller 1 surely. Furthermore, a conveying roller pair 3 to convey the separated original and a registration roller 4 are arranged, and the original that passed these rollers is conveyed in a direction of a continuous reading glass 201 by a roller 7. The original fed by the roller 7 passes near the back-side-image-reading unit 308 and is ejected to an original eject tray 31 through an eject roller 8.

In addition, a guide regulation plate (not shown) that can slide in an auxiliary scanning direction of the original batch stacked on the original tray 30 is attached on the original tray 30. An original width detection sensor (not shown) that is linked with the guide regulation plate to detect an original width is also attached. An original size of an original batch stacked on the original tray 30 becomes discriminative by a combination of the original width detection sensor and a sensor 11. In addition, an original length can be detected by an original length detection sensor (not show) arranged in the conveyance path based on a conveyance time from a detection of a front edge of an original to a detection of an end edge during conveyance. The original size is also discriminative from a combination of the detected original length and the original width detected by the original width detection sensor mentioned above.

The image reading device 200 reads image information recorded on an original optically, performs photo-electric translation, and inputs as image data. As elements for that purpose, a scanner unit 209 having the lamp 203 and a mirror 204, mirrors 205 and 206, a lens 207, the CCD 208, etc. are provided. In addition, a shading white board 210 to generate reference data of a white level by shading is arranged other than the continuous reading glass 201 and a platen glass 202.

Then, actions in an original reading mode to read originals (one-sided and two-sided originals) where images are read by moving the originals while keeping the scanner unit 209 at a fixed position will be described with reference to FIG. 2A through FIG. 5.

When the automatic document feeding device 100 is instructed to start feeding of an original, the scanner unit 209 moves to a position just below the shading white board 210 to perform shading compensation at the side of the image reading device 200. Furthermore, shading compensation at the side of the back-side-image-reading unit 308 (see FIG. 2A) is performed in parallel using a white reference board on a movement glass (not shown) of the back-side-image-reading unit 308. Then, the sheet feeding roller 1 falls upon a top side of an original, and only one original at the most top layer is separate from an original batch by means of the separation roller 2 and the sheet feeding roller 3, and is fed to the registration roller 4. At this time, the scanner unit 209 moves to a position just below a point R (see FIG. 2B).

Figure 3A:
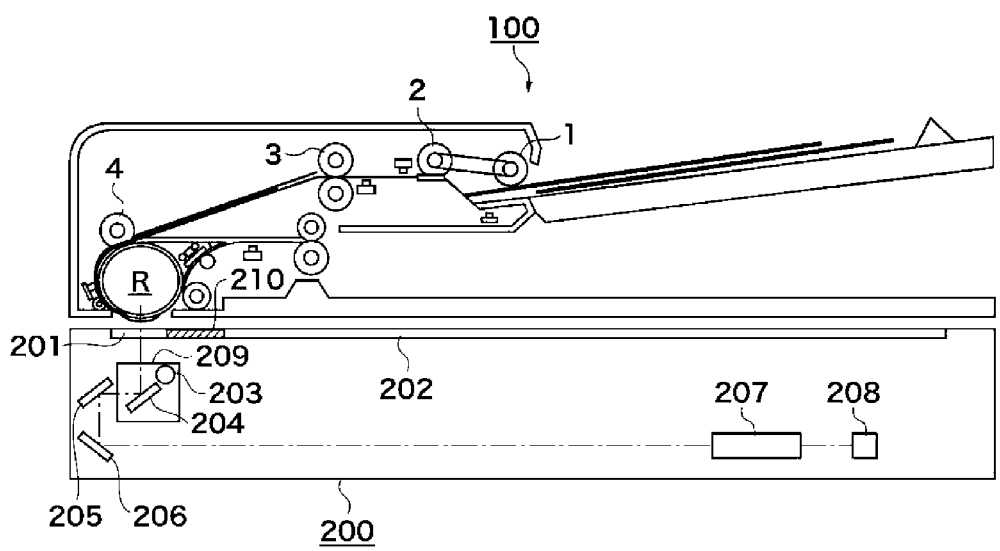
FIGS. 3A and 3B are sectional views schematically showing actions of the automatic document feeding device and the image reading device according to the embodiment.

When the registration roller 4 rotates, the original is led onto the continuous reading glass 201 via a sheet feeding path (see FIG. 3A). The original is conveyed at a predetermined speed on the point R in the figure, and an image of the original is read by the scanner unit 209 that waits under the point R. At timing when the front edge of the original passes the point R, the CPU 321 of the image reading device 200 is notified of a signal to start reading.

Figure 3B:
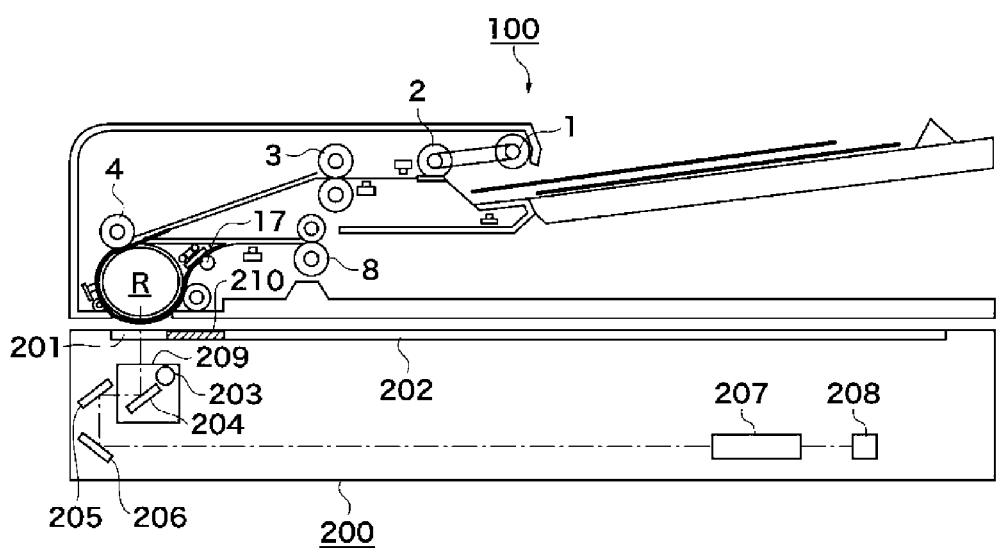
Figure 4A:
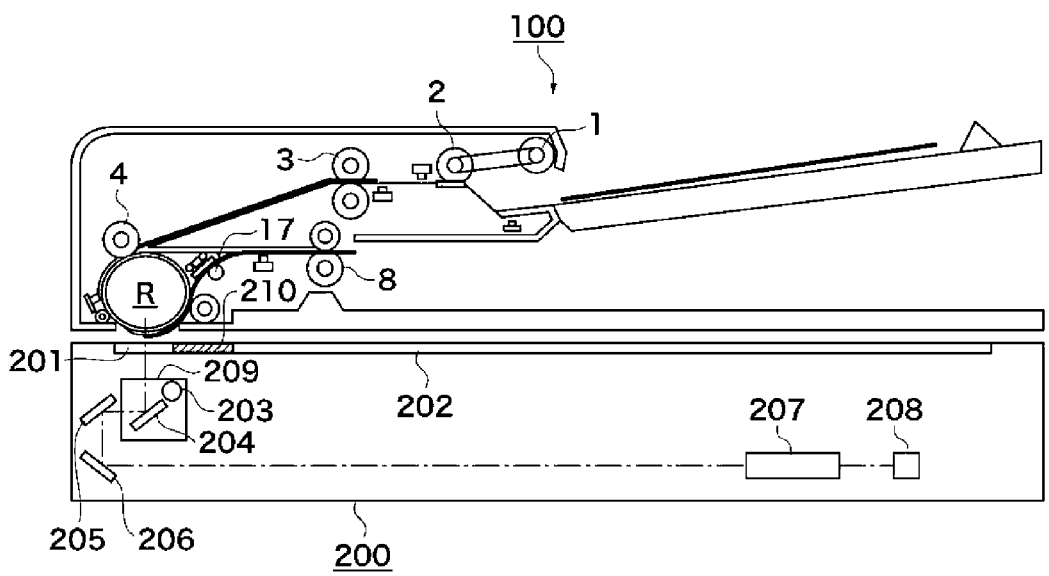
FIGS. 4A and 4B are sectional views schematically showing actions of the automatic document feeding device and the image reading device according to the embodiment.
Figure 4B:
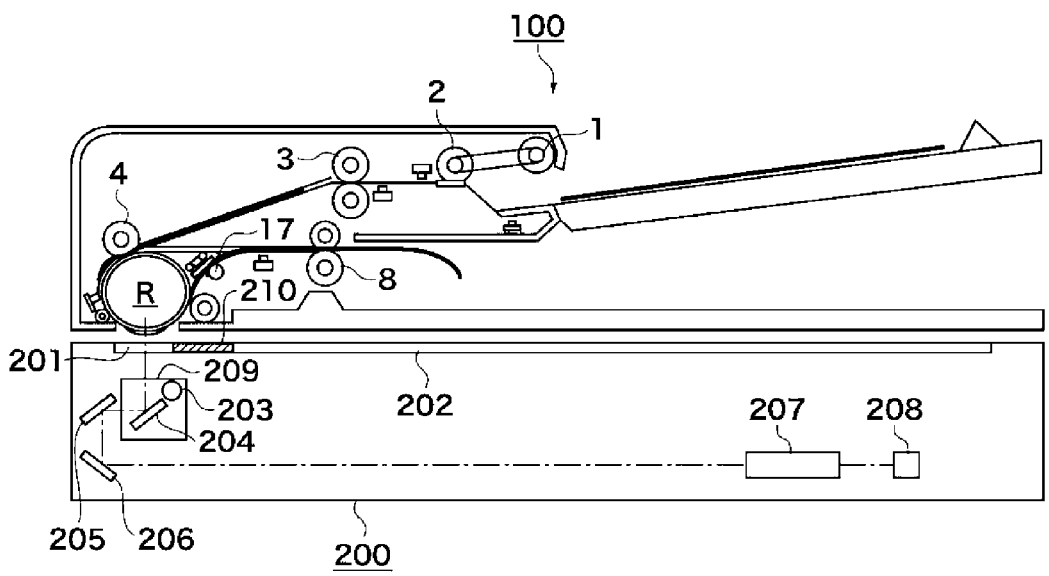

In a case of a mode for reading both sides of an original at the same time, while the scanner unit 209 is reading a front side image of the original, the back-side-image-reading unit 308 reads a back side image of the original (see FIG. 3B and FIG. 4A).

When the back-side-image-reading unit 308 finishes reading the end edge of the back side (see FIG. 4B), the read original is ejected to the original eject tray 31 of the automatic document feeding device 100 by the eject roller 8.

Figure 5:
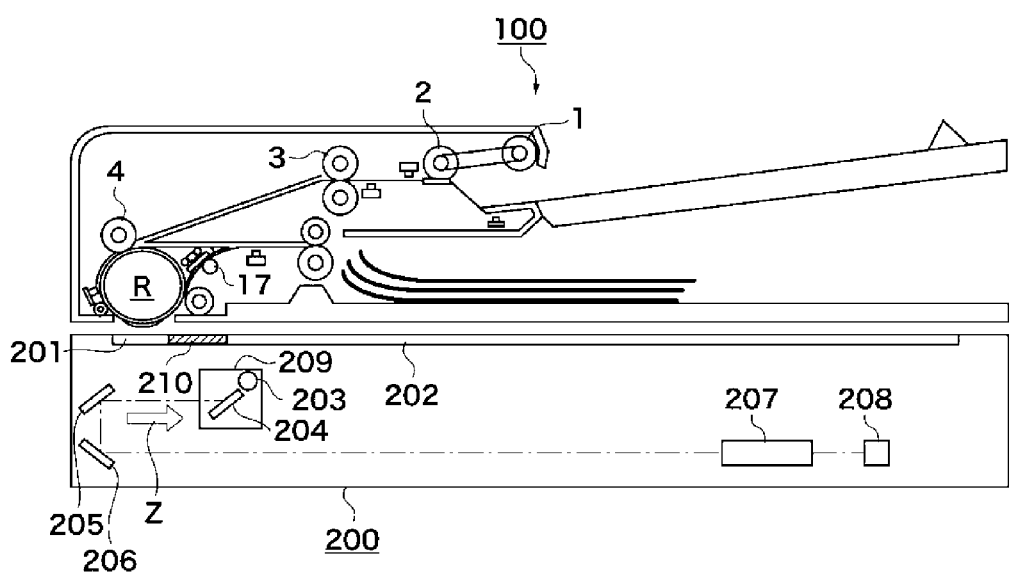
FIG. 5 is a sectional view schematically showing an action of the automatic document feeding device and the image reading device according to the embodiment.

In addition, when the end edge of the original passes the sheet feeding roller 3 while the N-th original is read at the point R, an (N+1)-th original starts to be fed from an original batch stacked on the original tray 30. This original is conveyed to the continuous reading glass 201 similarly, and a reading action for the image on this original is performed. At this time, when a start timing of the registration roller 4 is controlled under the condition where a new original bumps against the registration roller 4, an interval between the new original and the original that is read on the point R is appropriately adjusted, and originals are conveyed at a predetermined interval on the continuous reading glass 201. When the reading and the ejection of the original are completed at all, the scanner unit 209 moves in the direction of an arrow Z as shown in FIG. 5.

Figure 6:
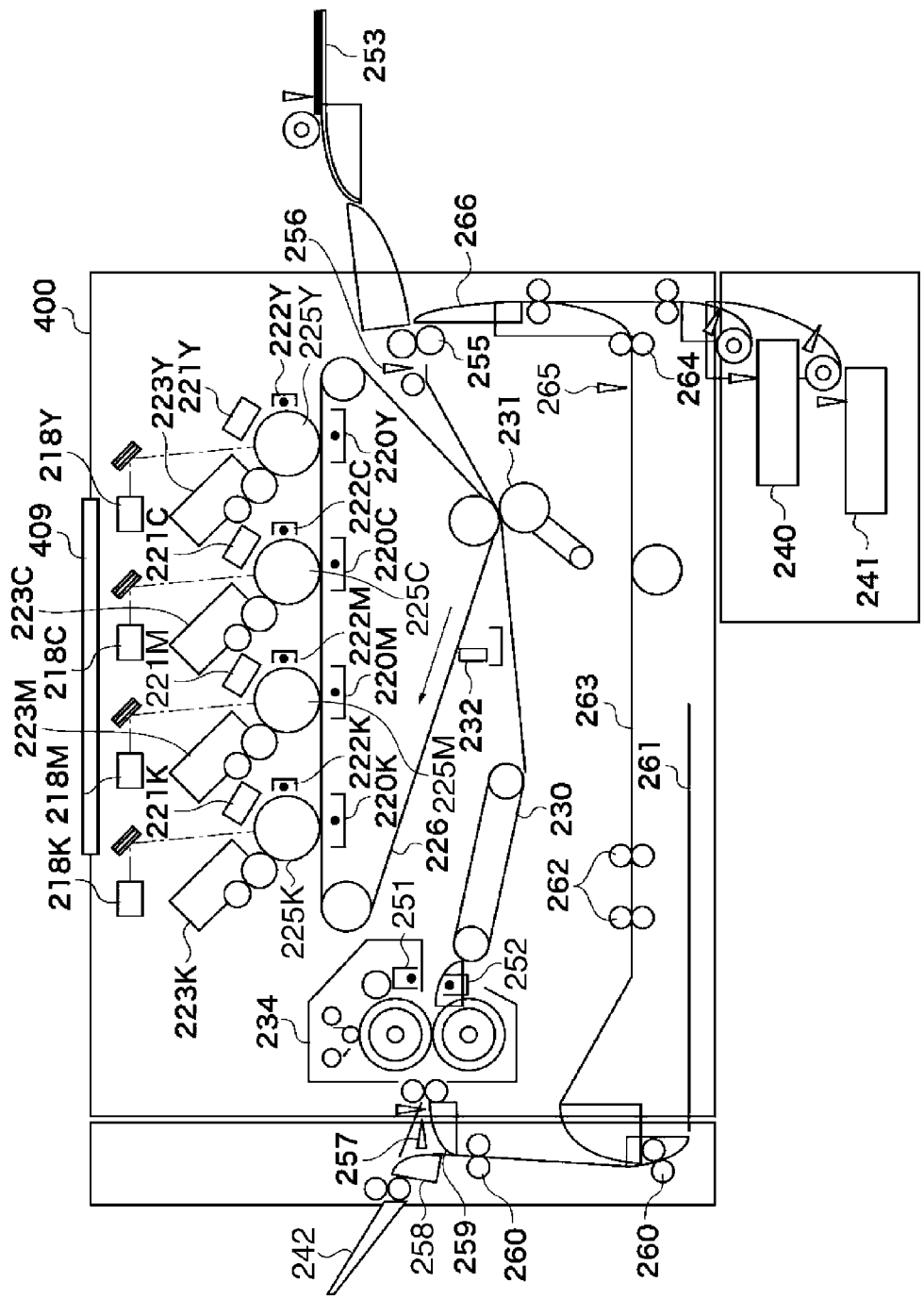
FIG. 6 is a sectional view showing an outline configuration of a printer unit according to the embodiment.

Next, a configuration of the printer unit 400 that uses an electrophotography method will be described with reference to FIG. 6. FIG. 6 is a sectional view showing an outline configuration of the printer unit 400 according to the embodiment.

The printer unit 400 has photoconductive drums 225Y, 225M, 225C, and 225K to form electrostatic images. Around the photoconductive drums 225Y, 225M, 225C, and 225K, primary electrostatic charge units 221Y, 221M, 221C, and 221K, exposure devices 218Y, 218M, 218C, and 218K, development devices 223Y, 223M, 223C, and 223K, transferring charge units 220Y, 220M, 220C, and 220K, and cleaning devices 222Y, 222M, 222C, 222K are arranged, respectively.

The development device 223K develops a latent image on the photoconductive drum 225K with black (K) toner. The development devices 223Y, 223M, and 223C develop latent images on the photoconductive drums 225Y, 225M, and 225C with yellow (Y) toner, magenta (M) toner, and cyan (C) toner, respectively.

The toner images developed on the photoconductive drums 225Y, 225M, 225C, and 225K are transferred in multiple to a transfer belt 226 as an intermediate transfer medium by the transferring charge units 220Y, 220M, 220C, and 220K in one go, and four-colored toner images are overlapped one another.

Sheet mediums stacked in cassettes 240 and 241 and a manual sheet feeding unit 253 are fed to an abutment position (a nip position) between a secondary transfer device 231 and the transfer belt 226. A toner image formed on the transfer belt 226 is transferred to a sheet medium at this nip position, and the toner image is fixed with heat by a fixing device 234, and the sheet medium is ejected outside the apparatus.

Image forming actions by the printer unit 400 constructed as above will be described.

First, a conveyance action of the sheet medium in the sheet feeding unit will be described.

The sheet mediums stacked in the cassettes 240 and 241 and the manual sheet feeding unit 253 are conveyed onto a sheet feeding path 266 one after another. The sheet medium on the sheet feeding path 266 is conveyed to a registration roller 255. A sensor 256 is arranged just behind the registration roller 255. When the sensor 256 detects passage of the immediately previous sheet medium, the conveyance action is stopped once after elapsing appropriate time in this embodiment.

As a result, the next sheet medium bumps against the stopping registration roller 255, and the transportation is stopped. At the time, the front edge of the sheet medium in a traveling direction is set to become perpendicular to the conveyance direction. This corrects a skew of the sheet medium. This process is called a sheet feeding registration. After the sheet feeding registration, the sheet medium is supplied to the secondary transfer device 231 by starting the registration roller 255.

Next, procedures to form an image on the front side of the sheet medium supplied to the secondary transfer device 231 will be described.

First, the surfaces of the photoconductive drums 225Y, 225M, 225C, and 225K are uniformly electrified in minus with a predetermined charging electric potential through the application of a voltage by the primary electrostatic charge units 221Y, 221M, 221C, and 221K. Next, the exposure devices 218Y, 218M, 218C, and 218K, which are comprised of laser scanner units, expose the photoconductive drums 225Y, 225M, 225C, and 225K electrified so that image parts become the predetermined exposure electric potential, and latent images are formed. Each of the exposure devices 218Y, 218M, 218C, and 218K forms a latent image corresponding to the image by turning a laser beam ON and OFF based on an image signal.

In addition, a developing bias set for each color beforehand is applied to a developing roller of each of the development devices 223Y, 223M, 223C, and 223K, and the latent image is developed at a position of the developing roller with toner at the time of passing and is visualized as a toner image. The toner images are transferred to the transfer belt 226 by the transfer devices 220Y, 220M, 220C, and 220K, and are transferred onto the sheet medium conveyed from the sheet feeding unit by the secondary transfer device 231. The sheet medium on which the toner image has been transferred is conveyed to the fixing device 234 through a fixing conveyance belt 230. In the fixing device 234, the sheet medium on which the toner image has been transferred is charged by pre-fix charge units 251 and 252 in order to supplement adsorbability of the toner to prevent image disorder. Furthermore, the conveyance path is switched by an eject flapper 257 after the toner image is fixed by heat by the fixing device 234. In the case of the one-sided printing, the eject flapper 257 is switched to an eject path 258, and the sheet medium on which the image has been printed on the front side is ejected to a sheet eject tray 242. In the case of the two-sided printing, the eject flapper 257 is switched to a back side path 259 as described below.

The toner particles remained on the photoconductive drums 225Y, 225M, 225C, and 225K are collected by the cleaning devices 222Y, 222M, 222C, and 222K. At last, the photoconductive drums 225Y, 225M, 225 C, and 225K are discharged to around 0V by discharging devices (not shown) uniformly, and are prepared for the next image forming cycle.

It should be noted that this printer unit 400 enables to feed the sheet mediums continually from the cassettes 240 and 241 and the manual sheet feeding unit 253. In this case, the sheet mediums are fed from the cassettes 240 and 241 and the manual sheet feeding unit 253 at the minimum interval to avoid overlap between the sheet mediums in consideration of the sheet length of the preceding sheet medium.

As mentioned above, after the sheet feeding registration, the sheet medium is supplied to the secondary transfer device 231 by starting the registration roller 255. At this time, the registration roller 255 stops temporarily by stopping transmission of drive power from a clutch after the preceding sheet medium is completely fed to the secondary transfer device 231. The registration roller 255 needs to stop temporarily before a following sheet medium reaches the registration roller 255 in order to perform the sheet feeding registration to the following sheet medium in the same manner as that to the preceding sheet medium.

Therefore, when focusing attention on the action of the registration roller 255, it is necessary to repeat the following series of operations (1) through (3) in order to form images on sheet mediums continually. That is, (1) the sheet feeding registration is performed after the front edge of the sheet medium reaches the stopping registration roller 255, (2) the sheet medium is fed to the secondary transfer device 231 by starting and rotating the registration roller 255, and (3) the registration roller is stopped when the feeding is completed.

Figure 7:
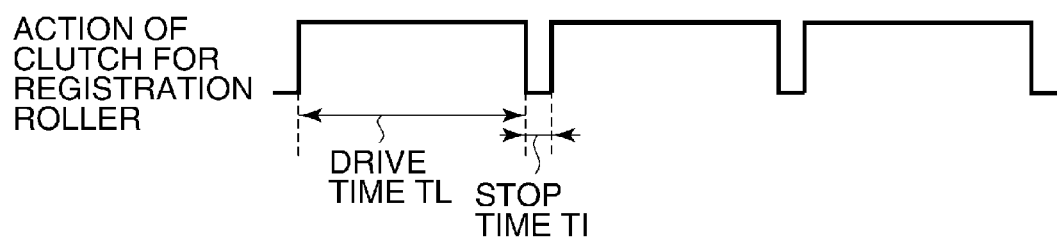
FIG. 7 is a timing chart showing an action of clutch for a registration roller of the printer unit in FIG. 6.

FIG. 7 is a timing chart showing an action of clutch for the registration roller 255 when the images are continuously formed on front sides of the sheet mediums. The action of clutch for the registration roller 255 is a repetition of a drive time TL for conveying the sheet medium and a stop time TI showing a time interval between the sheet mediums that is needed to perform the sheet feeding registration. A sum of the drive time and the stop time becomes the least time necessary to convey a sheet medium. The drive time TL of the registration roller 255 for the action (2) mentioned above depends on the recording sheet length of the sheet medium fed. That is, when the sheet length of the sheet medium is determined, the least time that allows continuous conveyance of the sheet mediums of the same size is found.

Subsequently, an action when an image is formed on a back side of the sheet medium will be described in detail.

When an image is formed on the back side of the sheet medium, the image forming on the front side of the sheet medium is performed beforehand. Since the image forming action on the front side has been described in detail as above, it is omitted here. When an image is formed on the back side, the conveyance path is switched to the back side path 259 by the eject flapper 257. The sheet medium is conveyed into a two-sided inverting path 261 once by rotary drives of inverting rollers 260. Then, the conveyance direction of the sheet medium is switched by inverse rotary drives of the inverting rollers 260 and drives of two-sided path conveying rollers 262 after the sheet medium is conveyed into the two-sided inverting path 261 by the length of the sheet medium in the conveyance direction. The sheet medium on which the image is formed on the front side is conveyed to a two-sided path 263 while turning the image side down. It should be noted that the two-sided path 263 is also called a sheet re-feeding path.

Subsequently, when the sheet medium is conveyed on the two-sided path 263 toward a sheet re-feeding roller 264, passage of the sheet medium is detected by a sheet re-feeding sensor 265 arranged just before the sheet re-feeding roller 264. When the sheet re-feeding sensor 265 detects passage of the sheet medium, the conveyance action is stopped once after appropriate time elapses in this embodiment. As a result, the sheet medium bumps against the stopping sheet re-feeding roller 264, and the conveyance stops temporarily. At the time, the front edge of the sheet medium in the traveling direction is set to become perpendicular to the conveyance direction. This corrects a skew of the sheet medium. This process is called a sheet re-feeding registration.

When the sheet re-feeding roller 264 starts after the sheet re-feeding registration, the sheet medium is conveyed on the sheet feeding path 266 again under a condition where the front and back are reversed. Since the image forming action after that is identical to the image forming action for the front side described above, it is omitted here.

The sheet medium on which images are formed on both of front and back sides is conveyed to the eject path 258 by the eject flapper 257, and is ejected to the sheet eject tray 242 in this way.

According to the above-mentioned actions, images can be formed to both sides of a sheet medium automatically without resetting the front and back of the sheet medium again by an operator in this embodiment.

Since the printer unit 400 has only one system of devices to form an image on a sheet medium and to fix a formed toner image, the front side printing and the back side printing cannot be performed at the same time. Therefore, the printer unit 400 alternately forms images to a sheet medium from the cassette 240 or 241 or the manual sheet feeding unit 253 and a sheet medium that is inverted for the back side printing and re-fed to the printer unit 400 at the two-sided printing in order to improve the print productivity.

Figure 8:
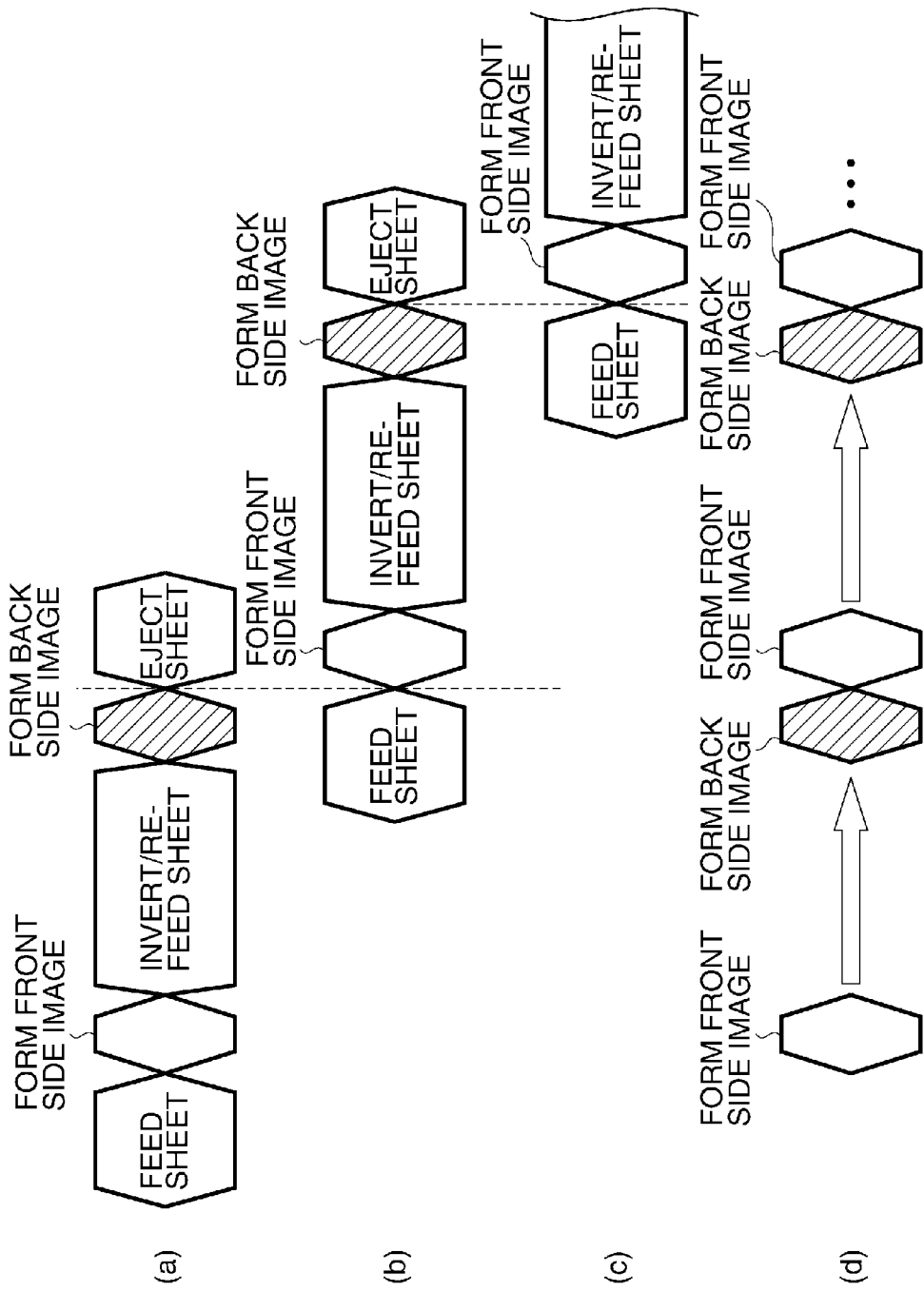
FIG. 8 is a timing chart showing a printing action when a two-sided printing is performed one by one.

When the printer unit 400 of this embodiment performs a two-sided printing, a sheet medium needs to be conveyed to the secondary transfer device 231 again after performing processes such as the image formation on the front side of the sheet medium and the inversion. Thus, since the conveyance path of the sheet medium becomes longer necessarily, the required time becomes longer as compared with the case where a sheet medium is fed from the cassette 240 or 241 or the manual sheet feeding unit 253. Therefore, if a front side printing and a back side printing are performed alternately from a first sheet medium, a waiting time from completion of the front side printing to a start of the back side printing becomes long, which remarkably reduces productivity. In FIGS. 8, (a), (b), and (c) show timings of the conveyances and the image formations for first, second, and third sheet mediums, respectively, and (d) shows only timings of the image formations for the sheet mediums.

Figure 9:
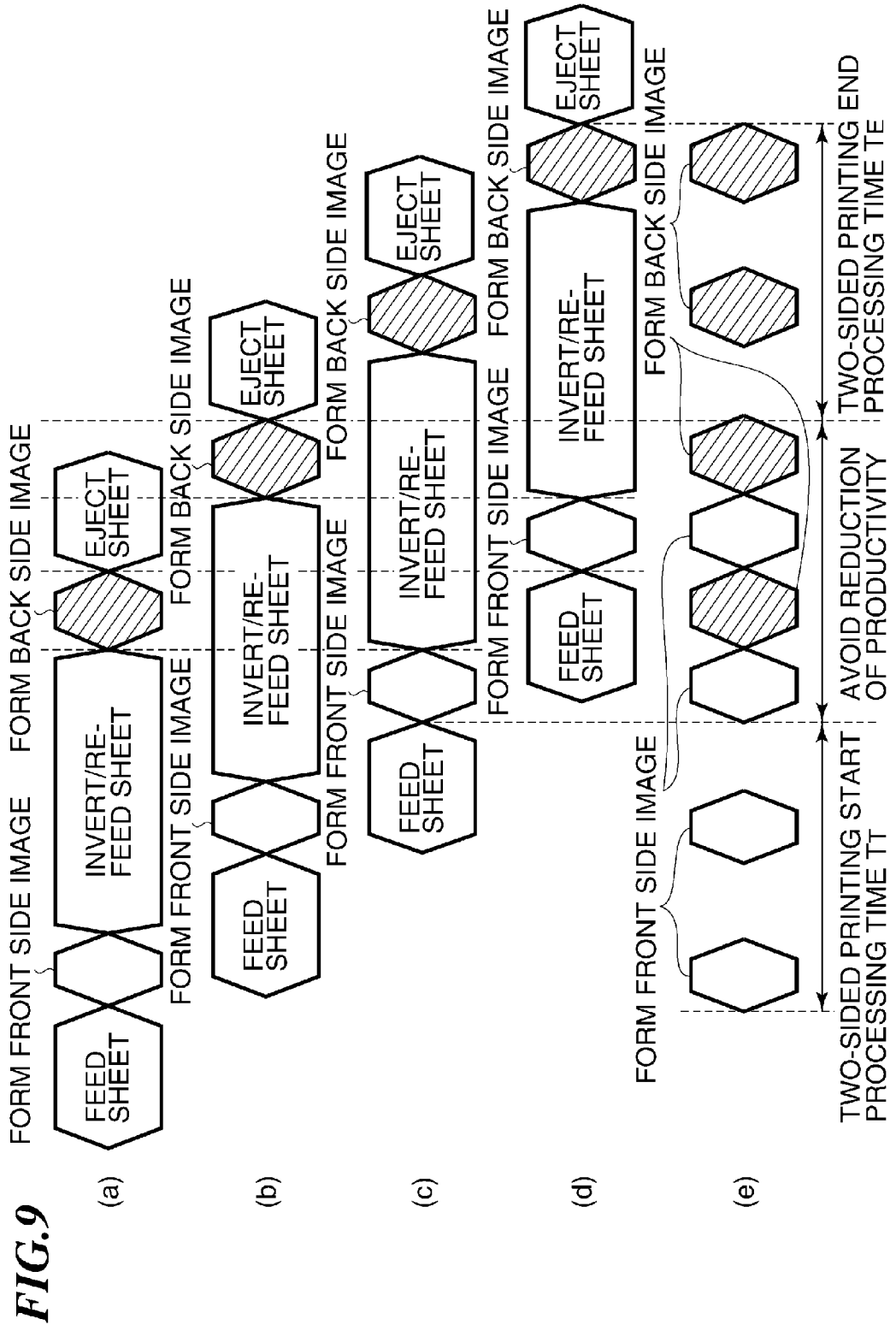
FIG. 9 is a timing chart showing a printing action in a through-pass two-sided method.

Thus, a through-pass two-sided method (an interleave two-sided method) is adopted as shown in FIG. 9 in this embodiment. In FIGS. 9, (a), (b), (c), and (d) show timings of the conveyances and the image formations for first, second, third, and fourth sheet mediums, respectively, and (e) shows only timings of the image formations for the sheet mediums. That is, as shown in FIG. 9, three sheet mediums are continuously conveyed from the cassette 240 or 241 or the manual sheet feeding unit 253, and front sides are printed continuously. During conveyance of fourth sheet medium and thereafter, sheet mediums that are inverted for the back side printing and sheet mediums from the cassette 240 or 241 or the manual sheet feeding unit 253 are fed alternately, which minimize reduction of productivity when the two-sided printing is performed.

Figure 10A:
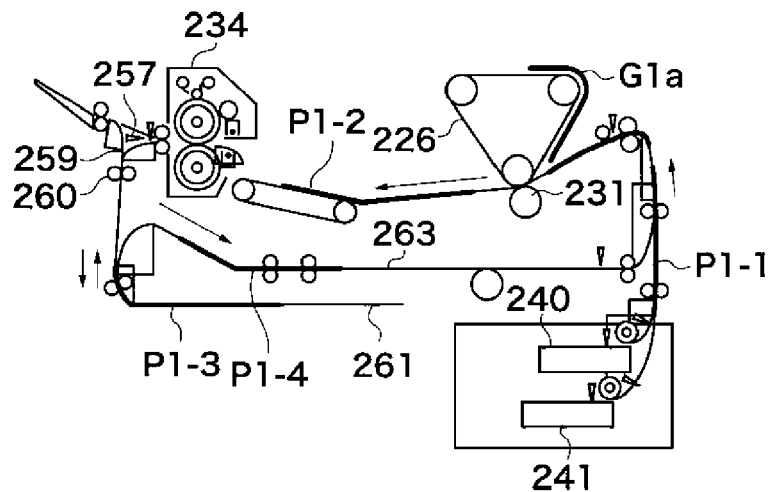
FIGS. 10A, 10B, and 10C are sectional schematic views of the printer unit in FIG. 6 showing printing actions in the through-pass two-sided method.
Figure 10B:
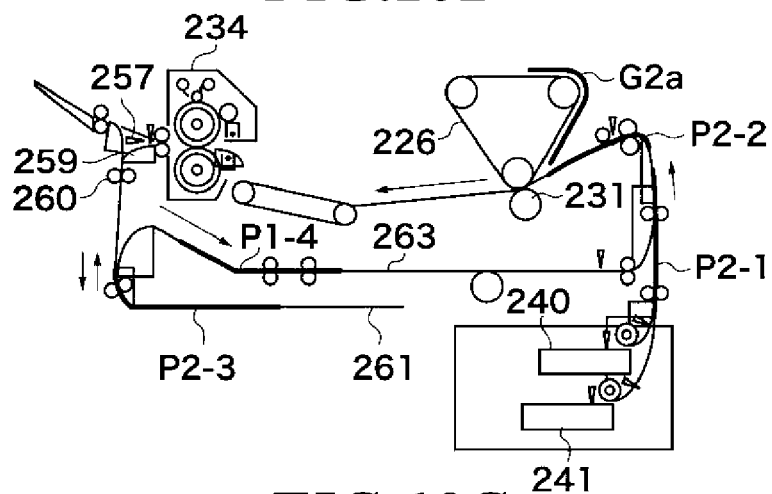
Figure 10C:
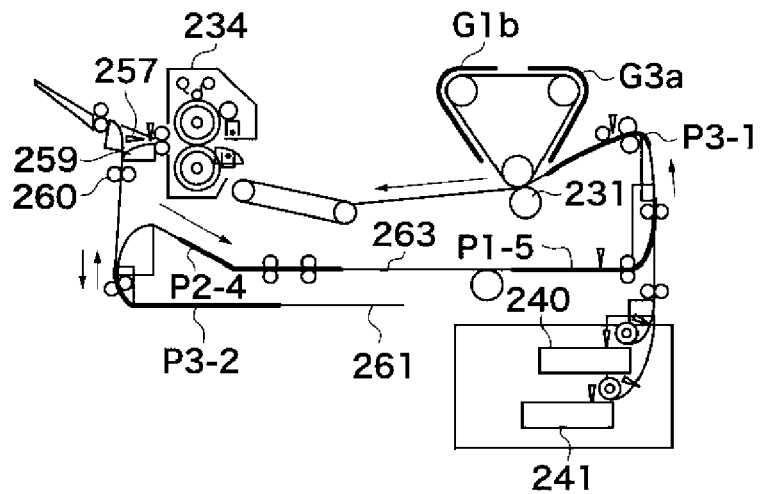

FIGS. 10A, 10B and 10C are cross sectional schematic views showing a sequence of the through-pass two-sided method in this embodiment, and show an example of the sequence of the through-pass two-sided method where three sheet mediums are conveyed in advance.

First, in a process shown in FIG. 10A, a first sheet medium is fed from the cassette 240 or 241 or the manual sheet feeding unit 253 (referred to as a front-side sheet feeding unit, hereafter) (P1-1). Then, a toner image (a front side image) G1a formed on the transfer belt 226 is transferred to the sheet medium (P1-2) by the secondary transfer device 231. The sheet medium is conveyed to the fixing device 234, and the toner image G1a is fixed by heat. After that, the conveyance path is switched to the back side path 259 by the eject flapper 257, and the sheet medium is conveyed into the two-sided inverting path 261 (P1-3) once and then is conveyed to the two-sided path 263 (P1-4) by the corresponding rotation drive of the inverting roller 260. It should be noted that the subscripts (-1 through -4) given to P1 in the figures show conveyance order of the conveying sheet medium, and P1-1, P1-2, P1-3, and P1-4 show the same sheet medium. It is similar about P2 and P3.

In the next process shown in FIG. 10B, a second sheet medium is fed from the front side sheet feeding unit (P2-1) and is conveyed to the secondary transfer device 231 (P2-2). A toner image (a front side image) G2a formed on the transfer belt 226 is transferred by the secondary transfer device 231 onto the second sheet medium. And the second sheet medium is conveyed to the fixing device 234, and the toner image G2a is fixed by heat. The conveyance path is switched to the back side path 259 by the eject flapper 257. The second sheet medium is conveyed into the two-sided inverting path 261 (P2-3) by the corresponding rotation drive of the inverting roller 260 so as to follow the first sheet medium. At this time, the first sheet medium is once stopped at a standby position on the two-sided path 263 (P1-4).

In the next process shown in FIG. 10C, a third sheet medium is fed from the front side sheet feeding unit (P3-1), and a toner image (a third front side image G3a) formed on the transfer belt 226 is transferred onto the third sheet medium by the secondary transfer device 231. At the time, the first sheet medium (P1-5) that has waited on the two-sided path 263 is conveyed toward the secondary transfer device 231 in an inverted condition following the third sheet medium, and a back side image G1b is transferred onto the back side of the first sheet medium. At this time, the second sheet medium is stopped to wait for the re-conveyance of the preceding first sheet medium on the two-sided inverting path 261. When the first sheet medium is conveyed toward the secondary transfer device 231, the second sheet medium moves to the two-sided path 263 (P2-4) following the first sheet medium.

After that, alternate printing of a front side and a back side can be performed by repeating the action described in FIG. 10C without lowering productivity as shown in the timing chart in FIG. 9. It should be noted that when printing of a plurality of sheets is finished, back sides of the three sheet mediums including the sheet mediums that have waited on the two-sided path 263 and the two-sided inverting path 261 in the apparatus are continuously printed.

However, even if such a sequence of the through-pass two-sided method is performed, there is no effect to shorten the interval between a front side image forming and a back side image forming, when a front sided sheet medium is conveyed in advance (a two-sided printing start processing time TT in the FIG. 9), which cannot avoid the reduction of the productivity. Therefore, when the number of sheet mediums to which the two-sided printing is performed is small, the influence of the reduction of the print productivity as the overall ratio grows large. As shown in FIG. 9, idle-time in the two-sided printing start processing time TT (the total of times between continuous front side image forming actions) is proportional to the number of sheet mediums that are fed or re-fed while a sheet medium that is fed from the front side sheet feeding unit arrives at the sheet re-feeding roller 264. This number of sheets is called a circulation sheet number. In this example, the circulation sheet number when the sheet mediums of A4 size are conveyed is equal to five. It should be noted that the circulation sheet number when the sheet mediums of A3 size are conveyed is equal to three.

Then, a one-sided/two-sided printing switching process which features this embodiment will be described as a process to improve the print productivity.

When a user copies originals, the user selects what is called a reading mode via a screen on the operation unit 10 from among a one-sided/two-sided mixture reading/printing mode, a two-sided reading/printing mode, and a one-sided reading/printing mode corresponding to the originals. Display screens on the operation unit 10 at this time in this embodiment are shown in FIG. 12A and FIG. 12B.

When selecting the reading mode, the user selects a "READ" button 10a in a mode selection screen as shown in FIG. 12A, and selects the type of reading originals in a screen as shown in FIG. 12B displayed successively.

In this example, it is assumed that the user selects an "AUTO MIXED ORIGINAL" button 10b and the one-sided/two-sided mixture reading/printing mode has been selected. In this case, the image forming apparatus of the embodiment prints by switching the one-sided printing and the two-sided printing automatically based on whether a read original is a one-sided original or a two-sided original.

Figure 11:
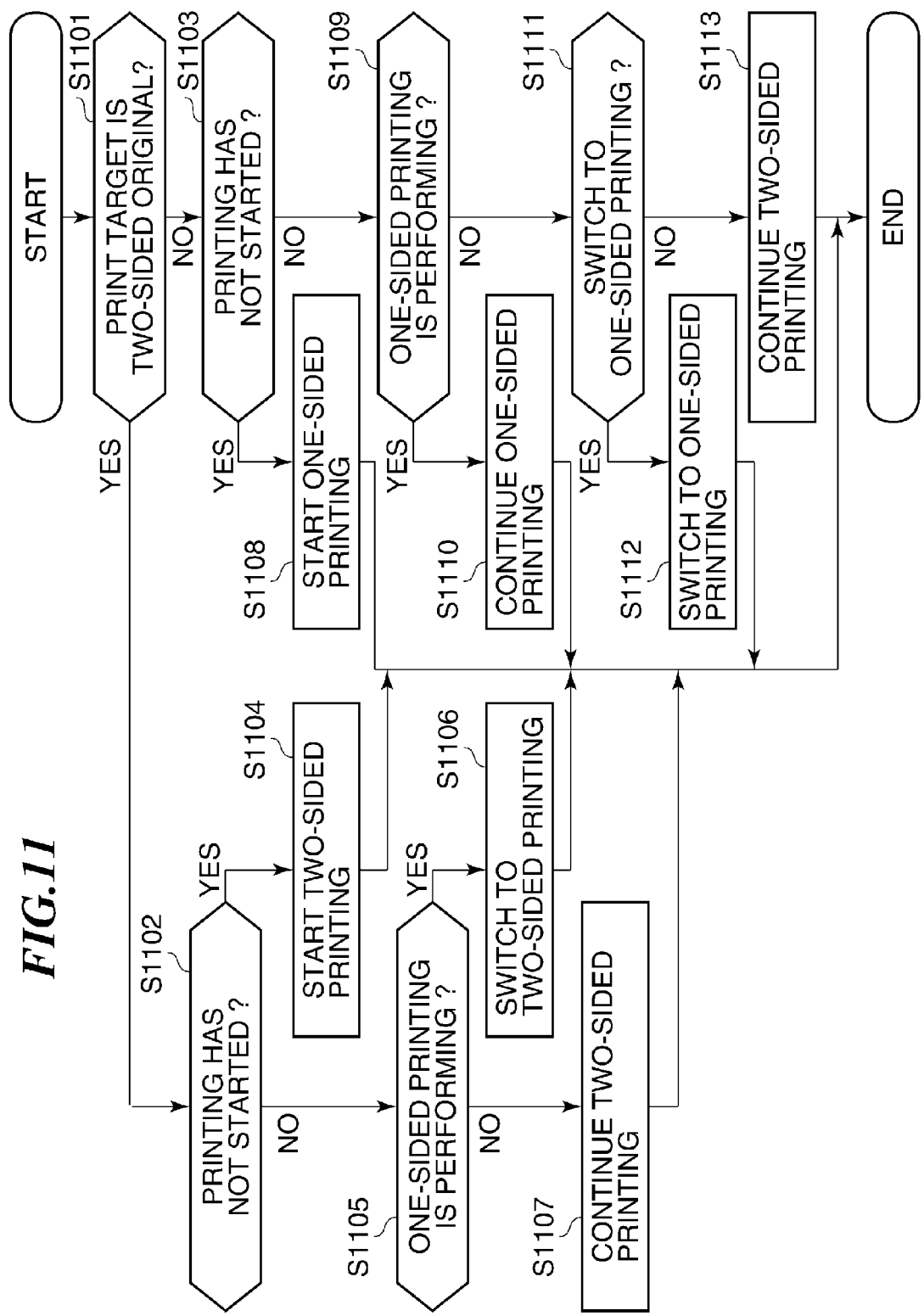
FIG. 11 is a flow chart showing a one-sided/two-sided printing switching process according to the embodiment.

FIG. 11 is a flow chart showing a one-sided/two-sided printing switching process according to the embodiment.

First, the CPU 401 determines whether an original as the next printing target is a two-sided original or a one-sided original in step S1101. In this embodiment, when the one-sided/two-sided mixture reading/printing mode is selected, it is detected whether a back side of an original is blank every time when the image reading device 200 reads an original image. This is performed using the blank sheet detection function mentioned above.

When a back side of an original is detected as a blank sheet at the time of reading an original image, it is determined that the reading original is a one-sided original. When a back side of an original is not detected as a blank sheet, it is determined that the reading original is a two-sided original. In this embodiment, a front side image, a back side image, and a one-sided/two-sided original determination result are linked and stored in the image memory 404.

Several pages of the original image read by the image reading device 200 in this embodiment is stored in the image memory 404. If an original image of a printing target is a two-sided original, the process by the CPU 401 proceeds to step S1102. On the other hand, if it is a one-sided original, the process proceeds to step S1103. In the step S1102, it is determined whether printing has already started. If printing has not started, the process proceeds to step S1104. If printing has already started, the process proceeds to step S1105.

In the step S1104, the CPU 401 starts two-sided printing (printing of the two-sided original image) unconditionally. On the other hand, in the step S1105, the CPU 401 determines whether the printing that has already performed is one-sided printing (printing of the one-sided original image) or two-sided printing. If it is the one-sided printing, the process proceeds to step S1106. If it is the two-sided printing, the process proceeds to step S1107. In the step S1106, the CPU 401 switches from the one-sided printing to the two-sided printing unconditionally. In the step S1107, the CPU 401 continues the two-sided printing because the two-sided printing has been already performing at present.

On the other hand, if the original of the printing target is determined as a one-sided original in the step S1101, the process following the step S1103 is performed.

In the step S1103, the CPU 401 determines whether printing has already started. If printing has not started, the process proceeds to step S1108. If printing has already started, the process proceeds to step S1109.

In the step S1108, the CPU 401 starts the one-sided printing unconditionally. On the other hand, in the step S1109, it is determined whether the printing that has already performed is the one-sided printing or the two-sided printing. If it is the one-sided printing, the process proceeds to step S1110, otherwise proceeds to step S1111.

In the step S1110, the one-sided printing is continued as-is because the one-sided printing has been already performing at present. In the step S1111, the CPU 401 determines whether the two-sided printing, which has been already started, is switched to the one-sided printing. The most suitable example of the determination at this time will be described in detail with reference to FIG. 13 as follows.

Figure 13:
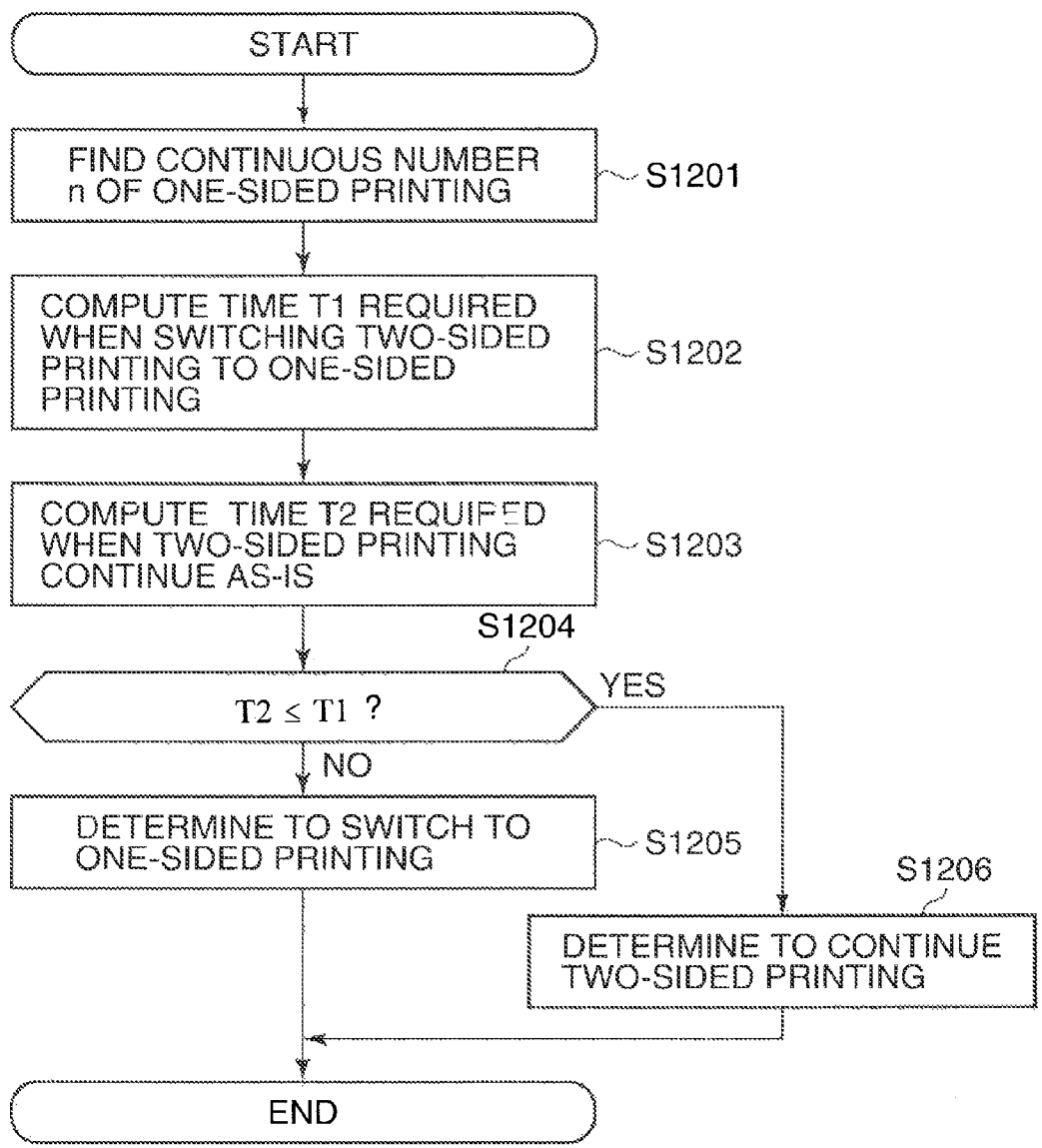
FIG. 13 is a flowchart showing a determination process in step S1111 in FIG. 11.

FIG. 13 is a flowchart showing a specific example of the determination process in the step S1111 in FIG. 11.

First, in step S1201, the CPU 401 finds a continuous number (predetermined number: number of sheets n) of one-sided originals among the originals that has been read at this point in time in advance based on the one-sided/two-sided original determination results that are recorded in the image memory 404 with the original images.

In the next step S1202, the CPU 401 computes a time T1 that is required to print one sheet medium when switching the two-sided printing to the one-sided printing and to the two-sided printing, under the condition where the one-sided printing is performed for n sheets and is switched to the two-sided printing from (n+1)-th sheet.

Specifically, a time Tx that is required to print on one-sides of n sheets of sheet mediums is found. Finding the time Tx uses the time required to perform the one-sided printing for one sheet, that is, a time TL required to form an image for a length of the printing sheet medium in the conveyance direction at a certain conveyance speed, an interval time TI that is required between the conveying sheet mediums, and the continuous number of sheets n of the one-sided printing. The time Tx is found from the following formula.

$$Tx=(TL+TI)n$$

Here, since the time TL required to form an image varies depending on a length of a sheet medium, the image memory 404 stores relationships between the time TL and the size of the sheet medium as table data as shown in FIG. 14. The time Tx is computed based on the data.

Furthermore, a two-sided printing end processing time TE shown in FIG. 9 is time required to finish the two-sided printing that is performing at present and to switch to the one-sided printing. Time required to perform the one-sided printing for n sheets after switching from the two-sided printing to the one-sided printing in this way from the present becomes Tx+TE. In addition, the time TT required to switch the one-sided printing to the two-sided printing is necessary to be added to this result, when it is known that the one-sided printing will be switched to the two-sided printing from (n+1)-th sheet based on the one-sided/two-sided original determination result stored with original images that have been read in advance. That is, T1 computed from the following formula is time that is required to print one sheet medium when switching the two-sided printing to the one-sided printing and to the two-sided printing, under the condition where the one-sided printing is performed for n sheets and is switched to the two-sided printing from (n+1)-th sheet.

$$T1=(Tx+TE+TT)/n$$

In step S1203, time that is required to print one-sided images by the two-sided printing as-is for n sheets is found. Since the total time is 2 n(TL+TI), the time per sheet is T2=2(TL+TI).

In step S1204, it is determined whether the two-sided printing should be switched to the one-sided printing according to the computation results in the step S1202 and the step S1203. That is, when T2>T1 is satisfied, it is determined to switch to the one-sided printing because the productivity will improve by switching the two-sided printing to the one-sided printing (step S1203). In addition, when T2≦T1 is satisfied, it is determined to continue the two-sided printing because it should not be switched (step S1206). In the step S1111 in FIG. 11, it is determined whether the printing is switched to the one-sided printing according to the determination result mentioned above. When it is determined to switch to the one-sided printing, the CPU 401 proceeds with the process to step S1112, and switches to the one-sided printing. In addition, when it is determined to continue the two-sided printing, the CPU 401 proceeds with the process to the step S1113, and continues the two-sided printing. That is, the sheet medium on which an image is printed on the front side is not ejected outside the apparatus as-is, it is turned upside down and is conveyed along the conveyance path like a case to form an image on the back side. However, an image is not formed on the back side actually. When the circulation sheet number is a fixed value, the time T1 mentioned above is inversely proportional to the continuous number of sheets of the one-sided printing. Therefore, the determination in the step S1204 is substantially equivalent to determining whether the continuous number of sheets of the one-sided printing is larger than the predetermined number of sheets depending on the circulation sheet number.

It should be noted that the switching from the two-sided printing to the one-sided printing improves the productivity even if the continuous number of sheets of the one-sided printing is smaller than the predetermined number under a condition where it is known that the one-sided printing is continued to the last sheet medium after switching to the one-sided printing. Because, even if the printing is finished by continuing the two-sided printing as-is, the time corresponding to the time TE is needed at the end of the printing as a result. Therefore, even if the printing is switched here, the time required for the switching does not affect to a difference of the final printing time.

Figure 15A:
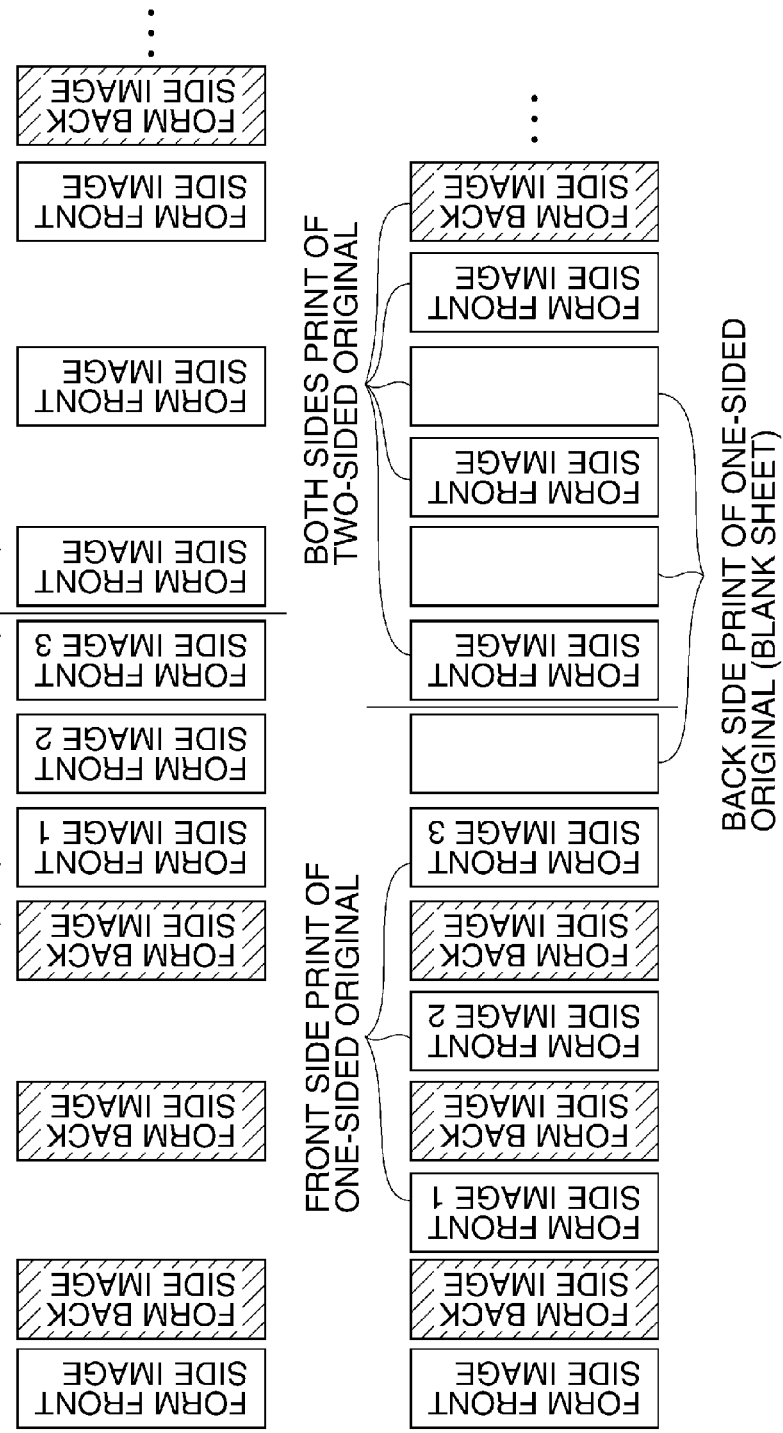
FIGS. 15A and 15B are timing charts showing printing actions to compare productivity when the two-sided printing is switched to the one-sided printing and productivity when the two-sided printing is continued without switching.
Figure 15B:
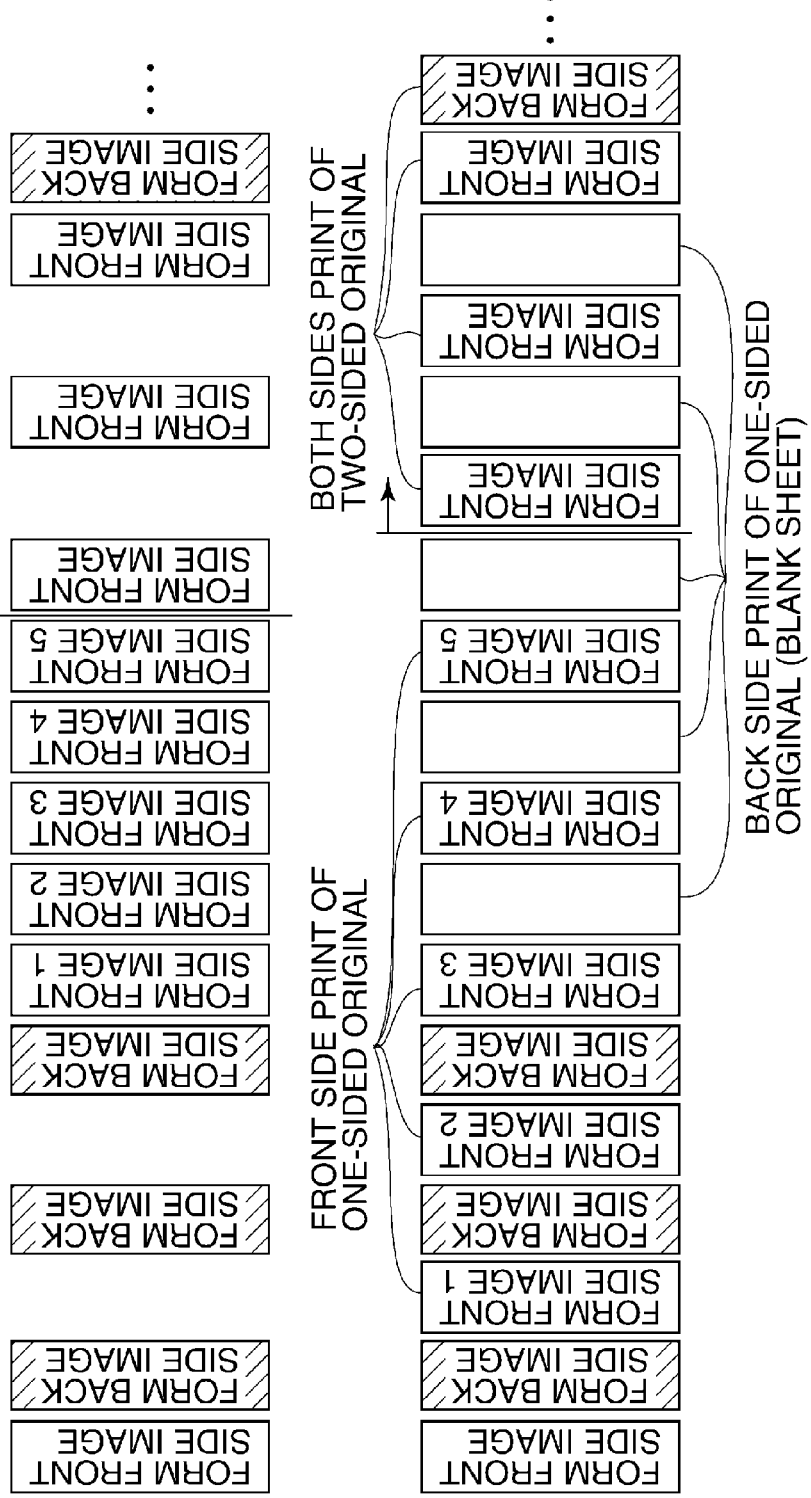

FIGS. 15A and 15B are timing charts showing image formations to sheet mediums of A4 size according to this embodiment for comparing productivities between a case where the two-sided printing is switched to the one-sided printing and a case where the two-sided printing is continued. FIG. 15A shows a case where three one-sided originals are continued, and FIG. 15B shows a case where five one-sided originals are continued. In addition, each of front side image formations 1 through 5 in the figures denotes the printing of the one-sided original. The front side image formations and back side image formations to which no numerals are applied denote the printing of the two-sided originals.

For example, when 1 to 3 sheets of one-sided originals and 1 to 3 sheets of two-sided originals are stacked alternately, the productivity is kept higher by continuing the two-sided printing even if one-sided originals are included as shown in FIG. 15A. Therefore, the CPU 401 continues the two-sided printing.

On the other hand, when 5 or more sheets of one-sided originals continue or when 3 or less sheets of one-sided originals continue to the last sheet, the productivity improves by switching to the one-sided printing as shown in FIG. 15B. Therefore, the CPU 401 switches to the one-sided printing. It should be noted that when 4 sheets of one-sided originals continue, the two-sided printing may be switched to the one-sided printing or may be continued because the difference between the time T1 and the time T2 is approximately zero.

It should be noted that this embodiment determines whether the one-sided printing is switched to the two-sided printing in consideration of the time required to switch, the length of the sheet medium in the conveyance direction, or the like. However, since an approximately equivalent effect is obtained by switching the one-sided printing and the two-sided printing by determining whether one-sided originals continue more than a certain number of sheets, a method to switch the two-sided printing to the one-sided printing only by such a determination may be adopted.

The above-mentioned certain number of sheets is equal to the number of continuous sheets n of the one-sided originals that can be assumed T2>T1. This certain number of sheets is stored in the image memory 404, and is used by the CPU 401 to determine the switching. That is, the CPU 401 determines whether the continuous number n of the one-sided originals continued following the two-sided originals is not less than the certain number of sheets. When it is determined that the continuous number n is not less than the certain number of sheets, the CPU 401 switches the two-sided printing to the one-sided printing.

In such a method, since the two-sided printing and the one-sided printing can be switched under a condition where predetermined number of one-sided originals continue, useless switching from the two-sided printing to the one-sided printing is avoided by the simpler determination, which enables to print more efficiently.

According to this embodiment, the following advantages are obtained in the image forming apparatus that allows an alternate sheet feeding printing, in which images are formed in advance to front sides of sheet mediums that can be conveyed within time period required to convey a sheet medium on which an image is formed on a front side to an image forming unit again during the two-sided printing.

(1) This embodiment considers a printing break time (equivalent to the two-sided printing end processing time TE) required to switch from the two-sided printing to the one-sided printing, and adopts the following method to prevent reduction of the productivity of printing due to the printing break time.

When the number of sheets of the one-sided printing after switching from the two-sided printing to the one-sided printing is n, for example, when copying an original batch in which a several sheets of one-sided originals and a several sheets of two-sided originals are stacked alternately, it is determined whether the two-sided printing is switched to the one-sided printing as follows. That is, first time T1 is compared with second time T2. The first time T1 is required for printing a certain number of original images when performing the one-sided printing for the continuous number (n) of one-sided original images after switching from the two-sided printing to the one-sided printing. The second time T2 is required for printing the certain number of original images when performing the two-sided printing for the continuous number of the one-sided original images without switching from the two-sided printing to the one-sided printing. When the printing time T1 is smaller than the printing time T2, the two-sided printing is switched to the one-sided printing. That is, the two-sided printing is switched to the one-sided printing depending on the difference between the time for printing a certain number of originals by the two-sided printing and the time for printing the certain number of originals by the one-sided printing. This enables to minimize useless switching from the two-sided printing to the one-sided printing (or from the one-sided printing to the two-sided printing), which improves the productivity of printing.

(2) The apparatus is provided with the user interface by which the operator selects the mode according to original images beforehand from among the mode to perform the one-sided printing only, the mode to perform the two-sided printing only, or the mode to automatically switch the one-sided printing and the two-sided printing (see FIGS. 12A and 12B). This enables to create a printed matter in accord with an intention of the operator regardless of a condition of an original.

(3) It is determined whether the switching between the two-sided printing and the one-sided printing should be performed in consideration of the difference of the productivities of printing due to the length of the sheet mediums (see FIG. 14), which enables to print more efficiently.

In the above-mentioned embodiment, a procedure to read an image of an original by the original reading device and to print the image is only described. However, the present invention can be applied to a case where data transmitted by a PC is printed.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-122095, filed on May 20, 2009, which is hereby incorporated by reference herein in its entirety.

What is claimed is:

1. An image forming apparatus comprising:
an input unit adapted to input a one-sided print job to form an image on one side of a sheet or a two-sided print job to form images on both sides of a sheet;
a sheet feeding unit adapted to feed a sheet;
an image forming unit adapted to form an image on a sheet based on a print job input by said input unit;
a sheet re-feeding conveyance path adapted to re-feed a sheet, on which an image is formed on a first side, to said image forming unit in order to form an image on a second side thereof; and
a printing mode switching unit adapted to selectively switch a printing mode between a two-sided printing mode to form images on both sides of sheets by continuously forming images on the first sides of a predetermined number of sheets and by alternately forming images on the second sides of sheets conveyed from said sheet re-feeding conveyance path and on the first sides of sheets fed from said sheet feeding unit, and a one-sided printing mode to form images on one sides of sheets without using said sheet re-feeding conveyance path;
wherein said printing mode switching unit determines, when the one-sided print job is performed between the two-sided print jobs, whether the one-sided print job is performed in the two-sided printing mode or in the one-sided printing mode, depending on whether the number of sheets continuously printed by the one-sided print job is more than a predetermined number.

2. The image forming apparatus according to claim 1, wherein said printing mode switching unit performs the one-sided print job following the two-sided print job in the two-sided printing mode when the number of sheets continuously printed by the one-sided print job is not more than the predetermined number.

3. The image forming apparatus according to claim 1, wherein the predetermined number of sheets is determined depending on the number of sheets on which images are continuously formed on the first sides in the two-sided printing mode.

4. An image forming apparatus comprising:
an image forming unit adapted to perform two-sided printing to form images on both sides of a sheet or one-sided printing to form an image on one side of a sheet;
an input unit adapted to input images to be formed on a first side and a second side of a sheet;
a first determination unit adapted to determine whether the images input by said input unit are two-sided original images that are formed on both sides of a sheet or the image input by said input unit is a one-sided original image that is formed on only one side of a sheet;
a second determination unit adapted to determine whether a printing in operation is the two-sided printing or the one-sided printing when said first determination unit determines that the input image is the one-sided original image; and
a control unit adapted to perform an alternate sheet feeding printing, in which images are formed in advance on first sides of sheets that can be conveyed within a time period required to convey a sheet, on which an image is formed on a first side, to said image forming unit again when the two-sided printing is performed, and to control whether the two-sided printing is switched to the one-sided printing based on a continuous number of the one-sided original images continued following the two-sided original images when said second determination unit determines that the two-sided printing is performing.

5. The image forming apparatus according to claim 4, wherein said control unit switches from the two-sided printing to the one-sided printing depending on a difference between printing time per a unit number of originals by the two-sided printing and printing time per a unit number of originals by the one-sided printing when said second determination unit determines that the two-sided printing is performing, the difference being decided based on the continuous number of the one-sided original images continued following the two-sided original images.

6. The image forming apparatus according to claim 4, wherein said control unit computes a first printing time that is required for printing a unit number of original images when performing the one-sided printing for the continuous number of one-sided original images after switching from the two-sided printing to the one-sided printing, computes second printing time that is required for printing the unit number of original images when performing the two-sided printing for the continuous number of the one-sided original images without switching from the two-sided printing to the one-sided printing, then compares the first printing time and the second printing time, and switches from the two-sided printing to the one-sided printing based on the result of a comparison.

7. The image forming apparatus according to claim 4, further comprising
a storage unit adapted to store a reference value of the continuous number of the one-sided original images under a condition where a printing time per a unit number of original images when performing the one-sided printing for the continuous number of one-sided original images after switching from the two-sided printing to the one-sided printing is less than a printing time per the unit number of original images when performing the two-sided printing for the continuous number of the one-sided original images without switching from the two-sided printing to the one-sided printing,
wherein said control unit determines whether the continuous number of the one-sided originals continued following the two-sided originals is not less than the reference value and switches from the two-sided printing to the one-sided printing based on the determination result.

8. A control method for an image forming apparatus that comprises an input unit to input a one-sided print job to form an image on one side of a sheet or a two-sided print job to form images on both sides of a sheet, a sheet feeding unit to feed a seat, an image forming unit to form an image on a sheet based on a print job input by the input unit, and a sheet re-feeding conveyance path to re-feed a sheet, on which an image is formed on a first side to the image forming unit in order to form an image on a second side thereof, and selectively switches a printing mode between a two-sided printing mode to form images on both sides of sheets by continuously forming images on the first sides of a predetermined number of sheets and by alternately forming images on the second sides of sheets conveyed from the sheet re-feeding conveyance path and on the first sides of sheets fed from the sheet feeding unit, and a one-sided printing mode to form images on one side of sheets without using the sheet re-feeding conveyance path, the control method comprising:

- determining whether the one-sided print job is performed between the two-sided print jobs;
- determining the number of sheets on which images are continuously formed by the one-sided print job when the one-sided print job is performed between the two-sided print jobs; and
- determining whether the one-sided print job is performed in the two-sided printing mode or in the one-sided printing mode depending on whether the number of sheets continuously printed by the one-sided print job is more than a predetermined number.

9. A control method for an image forming apparatus that comprises an image forming unit to perform two-sided printing to form images on both sides of a sheet or one-sided printing to form an image on one side of a sheet, an input unit to input images that should be formed on a first side and a second side of a sheet, and allows an alternate sheet feeding printing, in which images are formed in advance on first sides of sheets that can be conveyed within time period required to convey a sheet, on which an image is formed on a first side, to the image forming unit again when the two-sided printing is performed, the control method comprising:

- a first determination step of determining whether the images input by the input unit are two-sided original images that are formed on both sides of a sheet or the image input by the input unit is a one-sided original image that is formed on only one side of a sheet;
- a second determination step of determining whether a printing in operation is the two-sided printing or the one-sided printing when it is determined that the image inputted is the one-sided original image in said first determination step; and
- a control step of controlling whether the two-sided printing is switched to the one-sided printing based on a continuous number of the one-sided original images continued following the two-sided original images when it is determined that the two-sided printing is performing in said second determination step.

* * * * *